April 28, 1936.      W. F. RIEGER      2,039,031
DRIVE FOR STOKERS
Filed Aug. 7, 1933
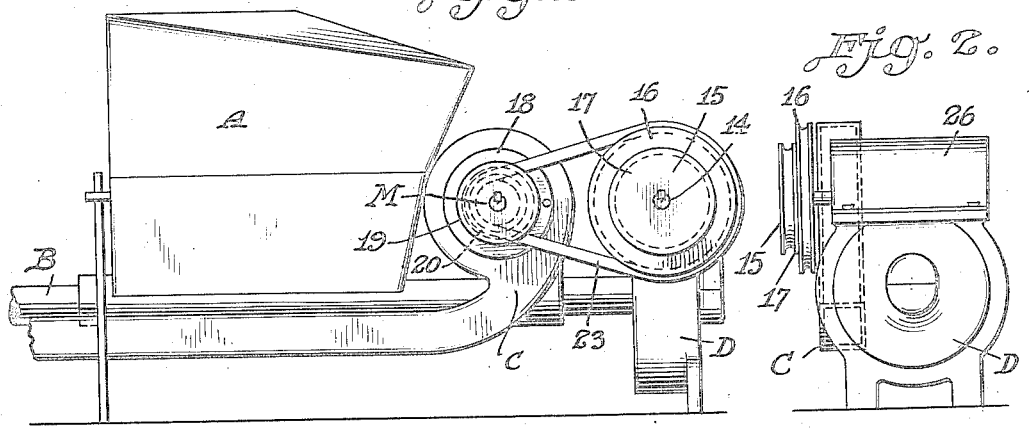
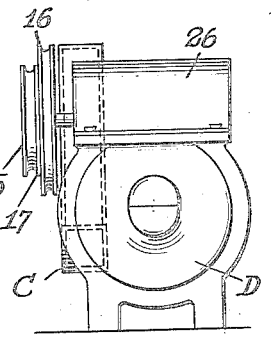
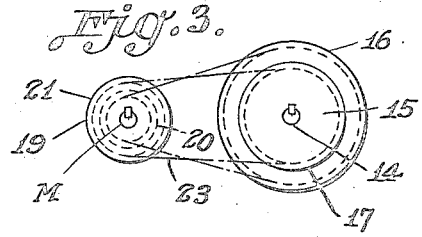
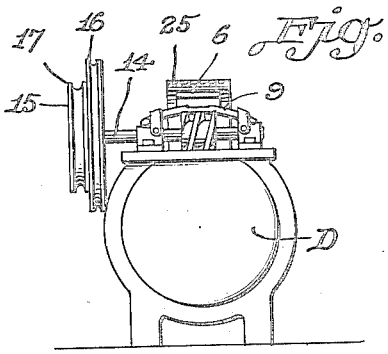
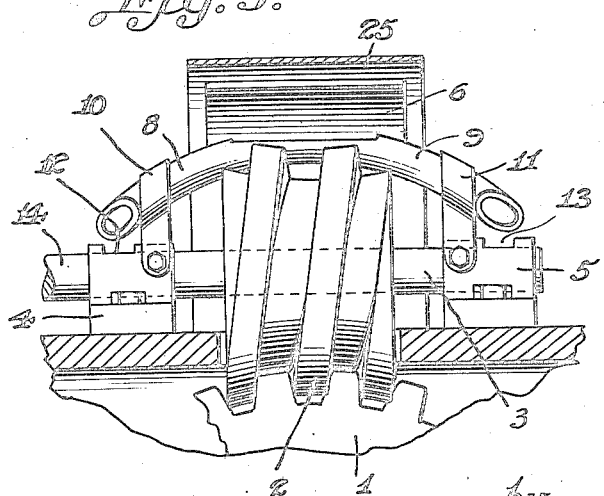
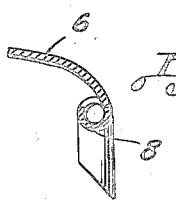
Inventor:
William F. Rieger
by R. M. Thomas
Attorney.

Patented Apr. 28, 1936

2,039,031

UNITED STATES PATENT OFFICE 2,039,031

DRIVE FOR STOKERS

William F. Rieger, Salt Lake City, Utah, assignor, by mesne assignments, to Charles T. S. Parsons, Salt Lake City, Utah Application August 7, 1933, Serial No. 684,006

1 Claim. (Cl. 184—13)

My invention relates to stokers and has for its object to provide a new and efficient method of driving and oiling the mechanism.

A further object is to provide a variable drive for stokers in which various diametered sheave wheels are used in conjunction with a V-type belt to drive the worm from the motor and to drive the air fan so that the belt may be changed from one sheave wheel to the next without difficulty, at the same time changing the speed of rotation of the drive worm and the feed screw of the stoker, without varying the speed of the driving motor.

A still further object is to provide a new and efficient method of oiling the bearings at the end of the drive shaft on which the worm is carried with the spray from the rotating worm to throw sufficient oil into the oiling device to provide for ample oil for the bearings of the device, thereby eliminating much trouble in oiling the device.

These objects I accomplish with the device illustrated in the accompanying drawing in which similar numerals and letters of reference indicate like parts throughout the several views and as described in the specification forming a part of this application and pointed out in the appended claim.

In the drawing I have shown the best and most preferred manner of building the invention, Figure 1 is a side elevation of the drive portion of a stoker with my device shown thereon.

Figure 2 is an end view of the gear casing.

Figure 3 is a face view of the drive sheave wheels, dotted lines to indicate the position of the belt for different speeds.

Figure 4 is a view similar to Figure 2, with the gear cover removed to show the drive worm and oiling device therefor.

Figure 5 is an enlarged view of the oiling device for the worm shaft bearings.

Figure 6 is a section of the oiling device.

In the drawing I have shown the hopper of the stoker as A, the feed pipe as B, the fan as C, and the gear casing as D. Within the gear casing D I provide a worm wheel 1 on the drive shaft of the drive screw (not shown) and driving the worm wheel 1, I provide a worm 2, mounted on a shaft 3 across the head of the gear casing D in bearings 4 and 5. The gear casing D is partially filled with oil and to provide oil for the bearings 4 and 5, I set a catch plate 6 adjacent the worm 2 by supporting it from arc shaped hollow delivery tubes 8 and 9, said tubes being secured to the top side of the bearings 4 and 5 by brackets 10 and 11. The ends of the delivery tubes 8 and 9 are over port holes 12 and 13 in the top of the bearings 4 and 5 so that oil caught on the plate 6 will drain down the tubes 8 and 9 into the holes 12 and 13 within the bearings. The catch plate is secured to the two inner ends of the tubes 8 and 9 and is formed to partially surround the top and one side of the worm 2 on the side that the rotation of the worm would throw the oil by the centrifugal force of the rotation of the worm.

Over the top of the catch plate I provide a shield 25 of metal formed in a semicircle, said shield to engage the sides of the base of the gear case and prevent oil from being thrown beyond the plate 6 onto the sides of the gear case cover 26 or out of the casing when the cover is removed.

Onto the end 14 of the shaft 3, I attach a double sheave drive wheel 15 by suitable keys or set screws, the double sheave wheel being formed with a large sheave 16 and a smaller sheave wheel 17. The fan C of the device is mounted directly to the motor shaft M and the shaft extends beyond the control plate 18 of the fan where a double sheave wheel 19 is secured onto the end of the shaft M. This sheave wheel is formed of a smaller sheave wheel 20 in alignment with the sheave wheel 16 of the shaft 3, and a larger sheave wheel 21 in alignment with the smaller sheave wheel 17 so that a belt 23 may be changed from one set of wheels to the other to change the speed of the drive. The fan C remaining at a constant speed at all times.

The exhaust of the fan which directs the air into the tuyère of the stoker is shown attached to the fan and extending forward therefrom with the fire pot and tuyère not shown.

The operation of the device is obvious.

The change of speeds may be made by changing the belt 23 from one set of wheels to the other, as necessary for the feed desired.

The oil is directed to the shafts as indicated.

Having thus described my invention I desire to secure by Letters Patent and claim:—

In a device of the class described, the combination of a gear housing; a worm gear carried and operating in said housing; spaced apart bearings mounted on the top of said housing; a shaft carried in said bearings; a worm on said shaft meshing with said worm gear; an arc shaped pipe carried in brackets spaced above said bearings with the open ends of the pipe feeding into oil holes in said bearings; a slot through the top of said pipe equal in length to said worm; a curved plate secured to one side of said pipe adjacent said opening to collect oil from the rotation of said worm and direct it into said opening, the plate being longer than the worm; and a shield extending up from one side of said housing partially encircling said curved plate, substantially as described.

WILLIAM F. RIEGER.